July 21, 1959 — P. DANIELSSON — 2,895,163
DEVICES FOR POSITIONING FISH
Filed Nov. 30, 1956
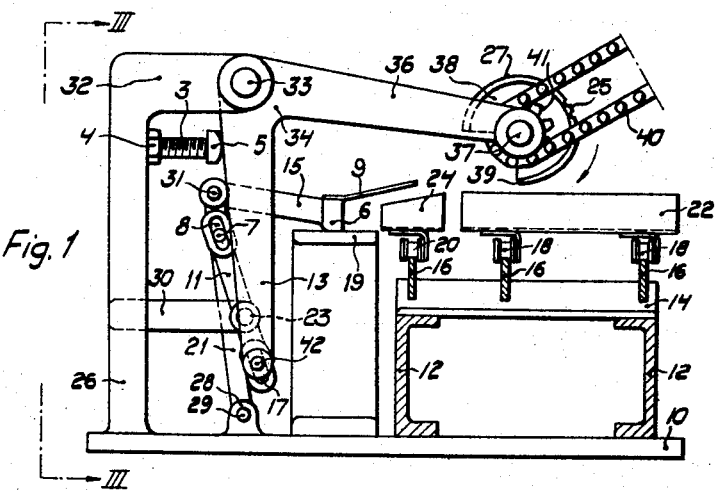
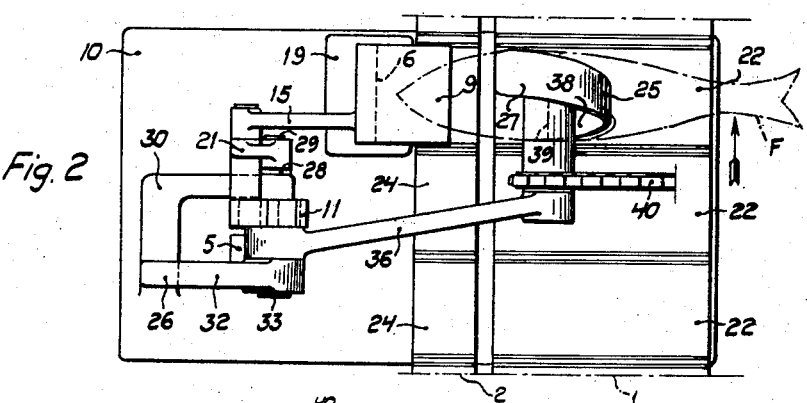
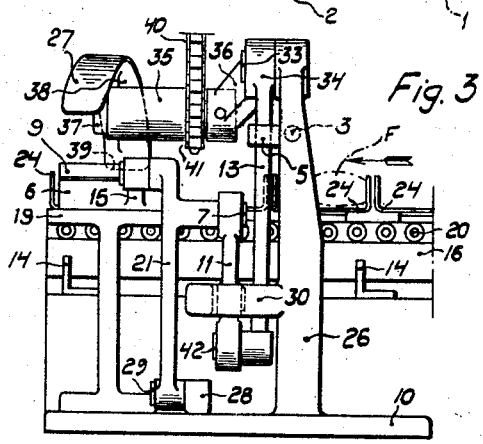
Inventor
Paul Danielsson
by Sommers & Young
Attorneys

United States Patent Office 2,895,163
Patented July 21, 1959

2,895,163

DEVICES FOR POSITIONING FISH

Paul Danielsson, Stockholm, Sweden, assignor to Arenco Aktiebolag, Stockholm, Sweden, a Swedish joint-stock company Application November 30, 1956, Serial No. 625,437

2 Claims. (Cl. 17—2)

This invention relates to devices for positioning fish, and it is an object of the invention to provide improved means for use in fish dressing machines in which the fish are to be positioned correctly, for example, positioned correctly, relative to means for cutting them closely behind the branchial arch irrespective of differences in size of the fish.

Another object of the invention is to provide fish positioning means capable of operating with a minimum of reciprocatory movements for positioning the fish in dependence of their thicknesses.

Still another object of the invention is to provide for increasing the operating speed of fish gauging and positioning means.

With these and other objects in view, the invention comprises certain novel features of construction, combination and arrangements of parts, as will be hereinafter described and particularly set forth in the claims hereunto appended.

In the drawings:

Fig. 1 is an elevational end view, partly in section, of a fish dressing machine embodying the invention.

Fig. 2 is a plan view of part of the machine shown in Fig. 1; and

Fig. 3 is an elevational view from the direction of line III—III of Fig. 1.

Referring to the drawing, the machine has three longitudinal rails 16 secured to a frame consisting of a plurality of L-shaped cross bars 14 which are secured to longitudinal channel bars 12 mounted on the base plate 10. The rails 16 carry a pair of roller chains 18 with pockets 22 for the body of the fish and a roller chain 20 with pockets 24 for the heads of the fish. The three chains 18 and 20 and pockets 22 and 24 form two conveyors 1 and 2 running in the direction of the arrows of Figs. 2 and 3.

In its illustrated embodiment the device for positioning the fish is mounted on a post 26 on the base plate 10. The post 26 has an upper horizontal arm 32 and a lower horizontal arm 30. By means of a pin 33 the upper arm 32 is pivoted to a bell crank lever 34 having a substantially horizontal arm 36 and a downwardly extending arm 13. On a pin 37 in the free end of the arm 36 is rotatably journalled a gauge member consisting of a rigid roller 38 provided with a sprocket 41 secured to its hub 37 and driven by a chain 40. The roller 38 has a segmental helical peripheral surface 27 part of which is provided with longitudinal ribs 25. The roller 38 is adapted to engage the laterally advancing fish F by its helical surface 27 which has such a pitch that it will continually engage the body of the laterally advancing fish at a point moving in the direction of the arrows (Figs. 2 and 3), that is, in the feeding direction of the conveyors 1 and 2. The helical surface 27 of the roller 38 extends circumferentially through less than 360 degrees and said surface is at its leading portion, terminating at the edge 39, curved slightly inwardly against the axis of rotation of the roller 38.

To the free end of the downwardly directed lever arm 13 is secured a pin 42 which projects into an elongated hole 17 in the lower end of a lever 11 which is pivoted to the lower arm 30 of the post 26 by a pin 23. The lever 11 has in its upper end an elongated hole 8 into which projects a pin 7 which is secured to a substantially vertical link 21. The link 21 is in turn pivoted to a bracket 28 on the base plate 10 by a pin 29. At its upper end the link 21 is pivotally connected to one end of a rod 15 by a pin 31, the other end of the rod 15 being formed integrally with a bar 6 extending in the fish feeding direction, that is, parallel with the conveyors 1 and 2 and constituting an abutment for the heads of the fish. The abutment 6 rests slidably on a horizontal plate 19 the upper surface of which is substantially coplanar with the bottoms of the fish pockets 22 and 24. To the abutment 6 is secured an obliquely upwardly projecting plate 9 adapted to guide the fish advancing towards said abutment 6.

The bell crank lever 34, lever 11 and link 21 comprise a motion transmitting system the transmission ratio of which is at least approximately 2 to 1 in as much as vertical movements of the roller 38 will cause the abutment 6 to move substantially twice as rapidly horizontally. This ratio will as a rule be satisfactory to position the abutment 6 so that the fish abutting same will be cut closely behind the branchial arch. If this transmission ratio should prove to be unsatisfactory the lever and link system 15, 21 can be adjusted in accordance therewith.

Below the upper arm 32 a stop screw 3 is screwed into the post 26 to which it is adjustably secured by means of a lock nut 4. The stop screw 3 has a head 5 serving as an abutment for the lever arm 13.

In the operation of the machine, the fish F are introduced individually into the conveyor pockets 22 so that they lie flat therein and their heads rest in the pockets 24 and the fish are fed laterally below a conventional rotary brush (not shown) which displaces the fish longitudinally so that their head ends abut a conventional stationary abutment (not shown) whereafter the pre-positioned fish enter the part of the machine shown in Fig. 2. Said stationary abutment occupies such a position that the head ends of the fish will project slightly out of the pockets 24 but not so far that they can interfere with the abutment 6. During the time a pocket 22 containing a fish is moving beneath roller 38 the roller is in such position that the omitted segment is facing downwardly so that the fish can move beneath the roller without interference from the periphery of the roller. When a pocket 22 has reached the position below the leading edge 39 of the rotating helical segmental roller 38, said leading edge engages the body of the fish resting in said pocket, whereby the roller 38 will be elevated to an extent depending on the thickness of the fish. This ascending movement of the roller 38 is by the levers 11 and 34, link 21 and rod 15 transmitted to the abutment 6 so that said abutment is displaced to the left (Fig. 1) into a position corresponding to the thickness of the fish measured by the roller 38 acting as a gauge member. Simultaneously the helical surface 27 of the rotating roller 38 rides on the fish and displaces its head forwardly towards the adjusted abutment 6. The pitch and diameter of the helical roller surface 27 and the velocity of the conveyors 1 and 2 as well as the rotary velocity of the roller 38 are adapted to each other so that the point of contact between the helical surface 27 and the laterally advancing fish moves in the fish feeding direction and at the same velocity as the conveyors. Since the leading portion of the helical roller surface 27 is curved inwardly the roller 38 will, when riding on the body of the fish, move slowly upwardly, or have its descending movement retarded, so that the initial rapid retraction of the abutment 6 will be followed by a slow retraction, a period of rest, or a slow reversal movement when the fish abuts said abutment, so that the head of the fish will not impinge upon the abutment 6 too forcibly. When the fish is fed further by the conveyors 1 and 2 it occupies such a position that it will be beheaded immediately behind its branchial arch, viz. by a conventional cutter (not shown) operating in the interspace between the pockets 22 and 24.

I claim:

1. In apparatus for positioning fish, means for conveying the fish transversely of its longitudinal direction of extent, a rigid rotatable roller mounted above said conveying means and having a segmental helical peripheral surface portion, means yieldingly supporting said roller in engagement with the body of the transversely conveyed fish and thus yieldingly adjusting its position with respect to said conveying means in dependence on the thickness of said fish engaged, an abutment mounted laterally adjacent said conveyor means in position to be engaged by said fish and being adjustable in the longitudinal direction of extent of said fish, means operably connecting said roller with said abutment to adjust said abutment longitudinally of the fish in accordance with the thickness of the fish, means operably interconnecting said roller and said conveying means to rotate said roller and cause its helical surface portion to displace the transversely advancing fish longitudinally of the fish toward and against said abutment, said roller having an interrupted peripheral segment whereby the peripheral extent of said helical surface portion of said roller is substantially less than 360 degrees, and the operably interconnected drives of said conveyor and roller being coordinated so that the interrupted portion of the roller's periphery is downward as the fish are brought under said roller.

2. In a device for positioning fish, means for conveying the fish transversely of its longitudinal direction of extent, a rigid rotatable roller mounted above said conveying means having a segmental helical peripheral surface portion yieldingly engaging the body of the transversely conveyed fish when located beneath said roller and movable vertically with respect to said conveying means in dependence on the thickness of said fish being engaged, an abutment mounted laterally adjacent said conveying means in position to be engaged by said fish and being adjustable in a longitudinal direction with respect to said fish, means operably interconnecting said roller and said conveying means to rotate said roller and cause its helical surface portion to displace the transversely advancing fish longitudinally against said abutment, and a lever and linkage mechanism interconnecting said abutment and said roller adjusting the position of said abutment in a definite relationship to the position assumed by said roller when engaging a fish, the leading end of said segmental helical portion being curved inwardly against the axis of rotation of said roller, the peripheral extent of said helical surface portion of said roller being substantially less then 360 degrees, and the operably interconnected drives of said conveyor and roller being coordinated so that the interrupted portion of the roller's periphery is downward as the fish are brought under said roller.

References Cited in the file of this patent

UNITED STATES PATENTS

| | | |
|---|---|---|
| 1,642,444 | Hovden | Sept. 13, 1927 |
| 2,245,330 | Danielsson | June 10, 1941 |
| 2,683,893 | Baader | July 20, 1954 |
| 2,772,711 | Carroll | Dec. 4, 1956 |